United States Patent [19]

Kogawa et al.

[11] 4,389,603
[45] Jun. 21, 1983

[54] WINDSHIELD WIPER SYSTEM FOR AN AUTOMOTIVE VEHICLE

[75] Inventors: Kouichi Kogawa; Teruo Kawasaki, both of Yokohama; Akitoshi Mimura, Tokorozawa, all of Japan

[73] Assignee: Nissan Motor Company, Limited, Kanagawa, Japan

[21] Appl. No.: 233,692

[22] Filed: Feb. 12, 1981

[30] Foreign Application Priority Data

Feb. 27, 1980 [JP] Japan .................................. 55-22637

[51] Int. Cl.³ .............................................. H02P 1/04
[52] U.S. Cl. .................................... 318/443; 318/444; 15/250.12; 15/250.13
[58] Field of Search .................. 15/250.12, 250.13; 318/443, 444, 306, 309

[56] References Cited

U.S. PATENT DOCUMENTS 3,549,974 12/1970 Bruegne ...................... 15/250.12 X
4,158,798 6/1979 Holt ............................. 15/250.13 X

FOREIGN PATENT DOCUMENTS 52-23135 5/1975 Japan .
52-23136 6/1975 Japan .
53-34221 3/1978 Japan .

*Primary Examiner*—Ulysses Weldon
*Attorney, Agent, or Firm*—Lowe, King, Price & Becker

[57] ABSTRACT

A windshield wiper system for an automotive vehicle such that intermittent wiper operation is controllable according to the distance travelled and the time elapsed, and is not merely dependent upon the speed of the vehicle. The windshield wiper system of the present invention thus improved comprises a distance signal generator, a time signal generator, a counter, and a wiper driving means, so that a more adequate intermittent wiper operation can be obtained in such a bad weather as drizzle or light rain, especially when the vehicle is travelling at a low speed or has stopped.

14 Claims, 3 Drawing Figures

WINDSHIELD WIPER SYSTEM FOR AN AUTOMOTIVE VEHICLE

BACKGROUND OF THE INVENTION

1. Field of the Invention

The present invention relates generally to a windshield wiper system for an automotive vehicle, and more particularly to a windshield wiper system for an automotive vehicle in which the intermittent time intervals of the wiper operations can be controlled in accordance with the time elapsed and the distance travelled, so that an adequate intermittent wiper operation can usually be achieved in inclement weather such as drizzle or light rain, especially when the vehicle is travelling at a low speed or has stopped.

2. Description of the Prior Art

The windshield wiper apparatus for an automotive vehicle is so designed as to be operable at high speed or at low speed by selectively depressing the switches thereof. However, in some wiper systems an intermittent wiper operation system is additionally provided therewith, which is usually especially effective in such bad weather as drizzle or light rain when continuous wiper operation may annoy the driver.

The intermittent time intervals of the wiper operation are generally determined by an intermittent time signal obtained by dividing a constant reference frequency generated from an oscillator. However, since it is desirable to adjust the time intervals manually or automatically according to the amount of rain striking the windshield, there exist windshield wiper systems in which the time intervals of the intermittent wiper operation can be adjusted. In the conventional intermittent-operation windshield wiper systems described above, the time intervals of the intermittent wiper operation are controlled from the standpoint that the amount of rain striking the windshield increases in proportion to the speed of the vehicle. However, the amount of rain is not closely related to a function of vehicle speed. This is because the amount of rain on the windshield is controlled by two factors based on the horizontal projection of windshield area and the vertical projection of that area. That is to say, one factor of the amount of rain on the windshield is based on the horizontal projection of windshield area, and has a close relationship to the time elapsed during the rainfall. Another factor of the amount of rain on the windshield is based on the vertical projection of windshield area, and has a close relationship to the distance travelled. This may easily be understandable from the fact that rain strikes the windshield even when the vehicle is parked. Therefore, it is not practical to control the period of the windshield wiper's intermittent operation on the basis of a function of vehicle speed only, since the amount of rain on the windshield is significant even when the vehicle speed is zero. In addition to the above problem, it is necessary to calculate a mean vehicle speed because it is practically impossible to control the time intervals of the wiper operation on the assumption that the instantaneous amount of rain is proportional to the instantaneous vehicle speed. Thus, an integration circuit is additionally required, thereby raising the problem that the system may be complicated and would therefore be costly.

A more detailed description of an example of the prior-art windshield wiper system will be made hereinafter with reference to FIG. 1.

SUMMARY OF THE INVENTION

With the foregoing problems in mind, it is therefore the primary object of the present invention to provide a windshield wiper system such that a signal representing the distance travelled and another signal representing the time elapsed, and not a signal representing the vehicle speed, are separately detected, added, and counted through a counter so as to drive the wiper motor whenever the counted value reaches a predetermined value, so that adequate intermittent wiper operation can be achieved in such bad weather as drizzle or light rain, in spite of a relatively simple circuit configuration.

To achieve the above mentioned object, the windshield wiper system of the present invention comprises a distance signal generator, a time signal generator, a counter for counting the abovementioned two signals and a driving means, in addition to a wiper motor and a manual setting switch.

The windshield wiper system according to the present invention thus improved can control the intermittent time intervals of the wiper operation in accordance with the time elapsed and the distance travelled, in addition to continuous high- and low-speed windshield wiper operations.

BRIEF DESCRIPTION OF THE DRAWINGS

The features and advantages of a windshield wiper system according to the present invention will be more clearly appreciated from the following description taken in conjunction with the accompanying drawings in which like reference numerals designate corresponding elements and in which.

DETAILED DESCRIPTION OF THE PREFERRED EMBODIMENT

Figure 1:
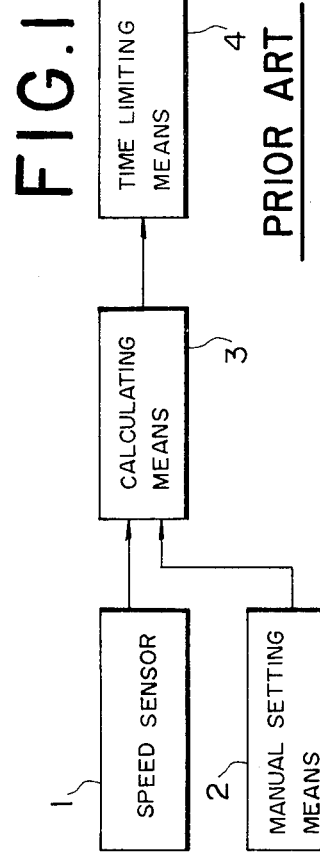
FIG. 1 is a schematic block diagram of a prior-art windshield wiper system for an automotive vehicle.

To facilitate understanding of the present invention, a brief reference will be made to a prior-art windshield wiper system for an automotive vehicle. With reference to FIG. 1, a speed signal from a speed sensor 1 and a manually-preset signal from a manual setting means 2 are both processed by a calculating means 3. A time limiting means 4 determines the period of the wiper operation, basing the calculated result, on the speed of the vehicle. After the waveform of the signal has been shaped through a driving means 5, the signal periodically operates a wiper motor 6.

In the prior art windshield wiper system described above, the time intervals of wiper operation are controlled in accordance with the vehicle speed only; therefore, such a system is inadequate for determining accurately the intermittent time intervals, especially when the vehicle speed is very low.

Figure 2:
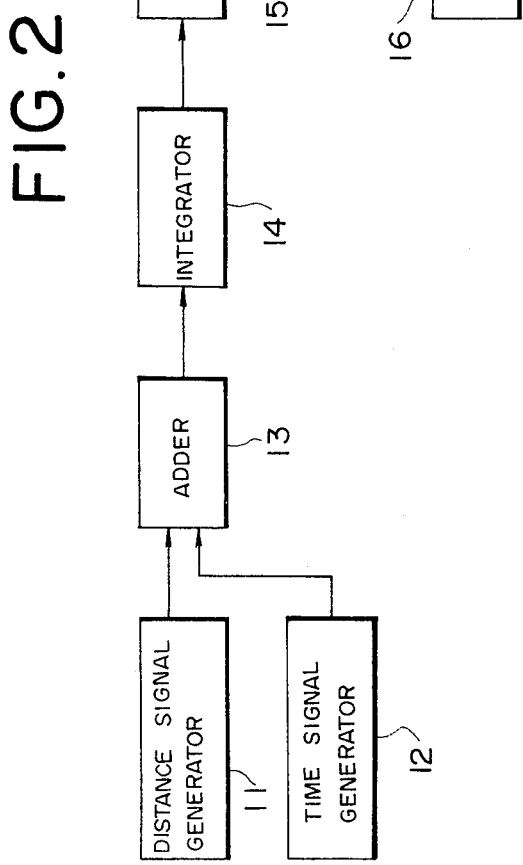
FIG. 2 is a schematic block diagram of a windshield wiper system of the present invention.
Figure 3:
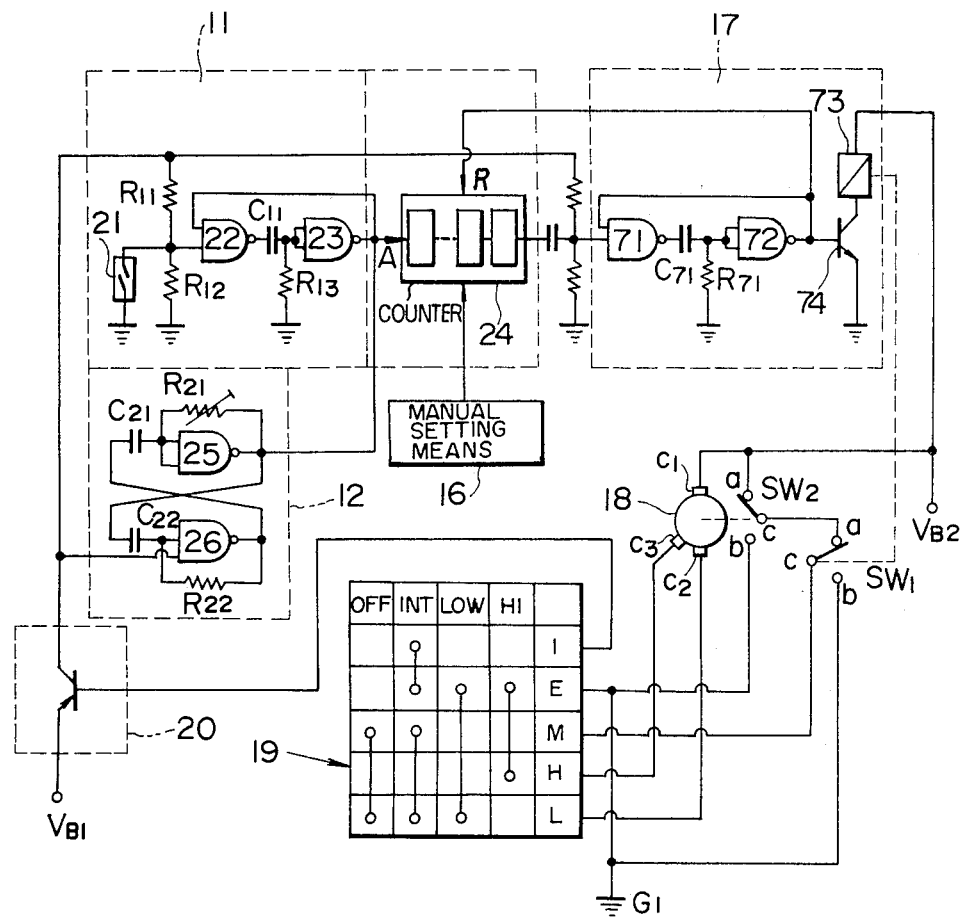
FIG. 3 is a schematic wiring diagram of the windshield wiper system shown in FIG. 2 according to the present invention.

In view of the above description, reference is now made to FIGS. 2 and 3, and more specifically to FIG. 3, wherein an embodiment of the windshield wiper system of the present invention is illustrated.

FIG. 2 shows a schematic block diagram of one embodiment of a windshield wiper system of the present invention. The point of the invention is that the amount of rain striking the windshield can be represented as a function of the elapsed time, in relation to the horizontal projection of windshield area, added to another function of the distance travelled, in relation to the vertical projection of windshield area.

The system is provided with a distance signal generator 11 having a switching means such as a reed switch or a photo-coupler and a time signal generator 12 configured by an oscillator such as an astable multivibrator. The distance signal generated by the distance signal generator 11 and the time signal generated by the time signal generator 12 are added in an adder 13, and integrated through an integrator 14 such as a counter. A calculating means 15 determines the period of the wiper operation depending upon the integrated signal output by the integration 14 and upon a manual signal selected by the driver through a manual setting means 16 according to the rainfall conditions. The output signal from the calculating means 15 is next input to a driving means 17 to shape the signal waveform to drive a wiper motor 18 intermittently.

FIG. 3 shows a wiring diagram of a modification of the embodiment of FIG. 2, which is configured by a digital circuit.

In FIG. 3, the same numerals are used to represent the elements previously described with respect to FIG. 2. Specific circuit details are shown for distance and time generators 11 and 12, as well as for driving means 17. As seen in FIG. 3, the distance signal generator 11 comprises a reed switch 21, resistors $R_{11}$, $R_{12}$ and $R_{13}$, a condenser $C_{11}$, and a monostable multivibrator formed by connecting two NAND circuits 22 and 23 in series in order to shape the waveform of a pulse from the reed switch 21 and also to output a pulse train having a low on-duty cycle so as to reduce the chance of interference of the distance pulse with the time pulse generated from the time signal generator 12. Therefore, it is possible to detect the distance travelled by counting the number of distance pulses generated by the reed switch 21. In this embodiment, the reed switch 21 is turned on every time the vehicle has travelled a fixed distance.

The time signal generator 12 comprises resistors $R_{21}$ and $R_{22}$, condensers $C_{21}$ and $C_{22}$ and an astable multivibrator formed by connecting two NAND circuits 25 and 26 in order to obtain a train of pulses with a constant period. The variable resistor $R_{21}$ is used to adjust the period of the pulse train generated by the astable multivibrator. Therefore, it is possible to detect the elapsed time by counting the number of the time pulses.

A counter 24 is provided to simulate the functions performed by blocks 13, 14 and 15 of FIG. 2.

The counter 24 is made up of several flip-flop stages for counting both the distance and time signals generated respectively by the monostable multivibrator (in the distance signal generator 11) and by the astable multivibrator (in the time signal generator 12) after the two signals are connected together at point A.

In other words, the last-stage flip-flop of the counter 24 outputs a wiper motor driving signal whenever the sum of the distance signals and the time signals reaches a predetermined value.

Additionally, the counter 24 in FIG. 3 performs the function of determining the period of wiper operation indicated as a separate calculating means 15 in FIG. 2.

One of several manually-selected intermittent time interval signals is applied to the counter 24 through a manual setting means 16. These signals are selectively preset by the driver according to the conditions of rain such as, for example, heavy, medium, or light rain. To describe this in more detail, the respective output terminals of the several flip-flop stages provided in the counter 24 are selectively switched so as to be directly connected to the next stage in accordance with the manually-selected intermittent time interval signals applied from the manual setting means 16, so that the predetermined value can be adjusted. That is to say, the counter 24 performs the two functions of counting and time limitation to determine the intermittent time interval of wiper operation.

The driving circuit 17 comprises a monostable multivibrator made up of two NAND circuits 71 and 72, a condenser $C_{71}$ and a resistor $R_{71}$, a relay 73, a switch $SW_1$ actuated by the relay 73, and a power transistor 74 to shape the waveform of the signal energizing the relay 73. The contact arm of switch $SW_1$ is connected to a contact point a when the relay is not energized, and connected to a contact point b when the relay is energized.

A wiper motor 18 is provided with an automatic stop switch $SW_2$ which is connected to a contact point a thereof when the wiper is at rest, and connected to a contact point b thereof when the wiper is in operation.

The reference numeral 19 denotes a wiper switch connecting a plurality of terminals therein according to the selected position. When this switch is set to the OFF position, two terminals M and L are connected to each other therein to stop the wiper motor because the two commutators $C_1$ and $C_2$ are at the same potential. This may be seen by tracing a circuit comprised of commutator $C_1$, commutator $C_2$, terminal L, terminal M, contact c of $SW_1$, contact a thereof, contact c of $SW_2$, and contact a thereof. When switch 19 is set to the INT position, two pairs of terminals I, E, and M, L, are respectively connected to each other, thereby to operate the wiper motor intermittently (as described hereinafter in more detail).

When the switch 19 is set to the Low Position, two terminals L and E are connected to each other in order to operate the wiper at a low speed. Such operation results from application of the supply voltage $VB_2$ to the motor via the circuit $VB_2$, commutator $C_1$, commutator $C_2$, terminal L, terminal E, and ground $G_1$. When set to the HI position, two terminals H and E are connected to each other within the switch, thereby to operate the wiper motor at a high speed. High speed operation results from application of the supply voltage $VB_2$ to the motor via the circuit $VB_2$, commutator $C_1$, commutator $C_3$, terminal H, terminal E, and ground $G_1$.

The reference numeral 20 denotes a switching transistor for applying the power supply to the circuit sections 11 to 15 for operating the wiper intermittently.

The intermittent operation of the wiper system described above will be explained hereinbelow in more detail.

When the wiper switch 19 is set to the INT position to operate the wiper intermittently while the vehicle is travelling, since the terminals I and E are directly connected to each other within the wiper switch 19, the base of the switching transistor 20 is grounded. This connection permits passage of a base current from the supply voltage $VB_1$ thereby passing the transistor current through the circuit sections 11 to 15 to operate the wiper intermittently.

Since the vehicle is travelling, a train of distance signals is generated by the reed switch 21 in the distance signal generator 11 to trigger the monostable multivibrator therein to output a stable waveform-shaped pulse train to the next stage.

Similarly, a train of time signals with a predetermined constant period is generated by the astable multivibrator in the time signal generator 12.

The two pulse signals are connected together at point A and input to the counter 24. In this mode of operation, it should be recalled that one of the manually-selected intermittent time interval signals has already been input to the counter 24 through the manual setting means 16, in order to switch the outputs of the several flip-flop stages therein according to rain conditions such as heavy, medium or light rain. Accordingly the counter 24 outputs a wiper driving signal to the driving means 17 the moment the number counted by the counter reaches a value predetermined and selected by the manual setting means 16.

The wiper driving signal is applied to the driving means 17 to trigger the monostable multivibrator therein, and the waveform-shaped output of the multivibrator is applied to the base of the transistor 74 to energize the relay 73, so that the switch $SW_1$ is switched from contact point a to b. In response to this switching action, the primary current is passed through the wiper motor 18 via the circuit supply voltage $VB_2$, commutator $C_1$ of the wiper motor 18, commutator $C_2$ thereof, terminal L of the wiper switch 19, terminal M thereof, contact c of $SW_1$, contact b thereof, and the ground $G_1$. This circuit is completed when the wiper switch 19 is set to INT, to connect terminal I to E and M to L, respectively, as shown in FIG. 3.

When the wiper motor 18 operates, the automatic stop switch $SW_2$ is switched from the contact point a to b, and thereby the motor current is passed therethrough via the circuit of the supply voltage $VB_2$, commutator $C_1$, commutator $C_2$, terminal L, terminal M, contact c of $SW_1$, contact a thereof, contact c of $SW_2$, contact b thereof and ground $G_1$, even after the switch $SW_1$ has been reset to the original contact position a. Thereafter, operation of the wiper motor is dependent upon the position of the wiper motor stop switch $SW_2$ which is actuated by the motor itself. That is, the motor is stopped when the switch $SW_2$ is switched from contact point b to a, because both the switches $SW_1$ and $SW_2$ are reset to the original position with the commutators $C_1$ and $C_2$ at the same potential.

Therefore, every time the number of pulses from the distance signal generator 11 and from the time signal generator 12 reaches a predetermined value, the counter 24 outputs a wiper driving signal to drive the wiper. In other words, the time intervals determined by the counter 24 change according to the pulses generated by the distance signal generator 11 and the time signal generator 12. The determined intervals are thus dependent upon the distance travelled and the time elapsed.

In the presently preferred embodiment, when the condition of rainfall changes, for instance, from light rain to heavy rain or vice versa, as already described, it is possible to adjust the intermittent time interval by selectively switching the output terminals of the multi-stage flip-flop to an adequate number of stages through the manual setting means 16. More specifically, when the condition of rain changes from medium rain to light rain, it is possible to extend the time interval within which the counter 24 outputs the wiper driving signal by operating the manual setting means 16, thus allowing an appropriate wiper operation according to the rain.

When the vehicle speed increases with the manual setting means 16 unchanged, the distance travelled increases in a fixed time period and thus the number of distance pulses from the distance signal generator 11 increases. As a result, an increase in the number of pulses input to the counter 24 shortens the time interval at which the value counted by the counter 24 reaches a predetermined value, thus reducing the intermittent time interval of the wiper motor operation.

In contrast with this, when the vehicle speed decreases with the manual setting means 16 unchanged, the intermittent time interval of the wiper motor operation is lengthened.

Further, when the vehicle has stopped, the distance signal from the distance signal generator 11 also stops. Nonetheless, the time signal from the time signal generator 12 is still generated, the counter 24 continues to output an intermittent time interval signal to the next stage to operate the wiper motor 28 the moment the counted value reaches a predetermined value.

In addition to the above description, the counter 24 is automatically reset by a reset signal applied to the reset terminal R thereof from the driving means 17 whenever the counter 24 outputs the intermittent time interval signal to the driving means 17.

Although not directly relating to the intermittent operation of the wiper system, low- or high-speed wiper operation is explained hereinbelow with reference to FIG. 3.

When he wiper switch 19 is set to the Low position since the terminals E and L are connected to each other, a primary current is passed through the wiper motor 18 via the circuit $VB_2$, commutator $C_1$, commutator $C_2$, terminal L, terminal E and ground G, so that the wiper motor 18 is driven at a low speed irrespective of the intermittent wiper operation system.

In the same way, when the wiper switch 19 is set to the HI position, since the terminals E and H are connected to each other, a secondary current is passed through the wiper motor 18 via the circuit $VB_2$, commutator $C_1$, commutator $C_3$, terminal H, terminal E and ground $G_1$, so that the wiper motor 18 is driven at a higher speed irrespective of the intermittent wiper operation system.

In addition, when the wiper switch 19 is set to the OFF position, since the terminals M and L are connected to each other, the commutators $C_1$ and $C_2$ are connected to each other with the same potential via the circuit $VB_2$, a of $SW_2$, $C_1$, $C_2$, L, M, c of $SW_1$, a of $SW_1$, c of $SW_2$, and a of $SW_2$, and $C_3$ is opened at terminal H. Thus, no current is passed through the wiper motor 18, and the motor 18 is stopped.

Further, in this embodiment of FIG. 3, although shown separately, the supply voltages of $VB_1$ and $VB_2$ are the same supply voltage applied from a single battery.

The embodiment of FIG. 3 is an example which utilizes digital circuits; however, it may be possible to use analog circuits for embodying the present invention. Furthermore, it may be possible to add the distance and time signals after counting, rather than to count the signals after addition as hereinabove described.

As described above, since the amount of rain striking the windshield is taken into consideration from the standpoint of two factors, that is, the time elapsed (proportional to rain striking the horizontal projection of windshield area) and the distance travelled (proportional to rain striking the vertical projection of windshield area); since both the factors are detected separately and counted after addition thereof; and since the intermittent time interval of wiper operation is determined when the counted value reaches a predetermined value preset by the manual setting means in consideration of the condition of rainfall, it is possible to provide an actual windshield wiper system such that the intermittent time interval of wiper operation is automatically adjusted appropriately to the amount of rain striking the windshield. As a result of this, the driver can enjoy a good front view through a windshield clearly wiped off without production of any unnecessary friction sounds or scratches between the wiper blades and the glass surface.

In addition, since a distance signal generator is provided for the system and the distance signal is applied directly to the next stage, no integration circuit is required to convert the detected signal into a vehicle average speed signal, thus allowing simplicity in circuit configuration and a reduction in circuit cost.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A windshield wiper system for an automotive vehicle which comprises:
   (a) a distance sensor for detecting a distance travelled by said vehicle and for outputting a train of distance signals;
   (b) a time signal generator for generating a reference time interval signal;
   (c) an adder for adding the distance signals from said distance sensor and the reference time interval signals from said time signal generator;
   (d) an integrator for integrating the output from said adder; and
   (e) a calculating means for comparing the signal from said integrator with a predetermined value and for outputting a wiper driving signal when the signal reaches a predetermined value,
   whereby intermittent time intervals of wiper operation can be controlled in accordance with the distance travelled and the time elapsed.

2. A windshield wiper system for an automotive vehicle as set forth in claim 1, which further comprises a manual setting means for presetting the predetermined value according to conditions of rainfall, said manual setting means being connected to said calculating means.

3. A windshield wiper system for an automotive vehicle as set forth in claim 2, which further comprises a driving means for outputting a wiper motor driving signal in response to the signal output by from said calculating means.

4. A windshield wiper system for an automotive vehicle as set forth in claim 3, which further comprises a wiper motor for moving the wiper blades to wipe away the rain striking the windshield.

5. A windshield wiper system for an automotive vehicle as set forth in claim 4, which further comprises a switch for applying a supply voltage to said wiper motor in response to the signal from said driving means, said switch being connected between a commutator of said wiper motor and the ground.

6. A windshield wiper system for an automotive vehicle as set forth in claim 5, which further comprises a wiper switch for switching the wiper system from continuous wiper operation to intermittent wiper operation, said wiper switch connecting a supply voltage to the wiper system and said wiper motor, so that the wiper motor is driven when said driving means outputs a wiper motor driving signal to said switch.

7. A windshield wiper system for an automotive vehicle as set forth in claim 1, wherein said distance sensor comprises:
   (a) a reed switch output by every time the vehicle travels a fixed distance; and
   (b) a monostable multivibrator for outputting a train of distance signals when triggered by a signal from said reed switch.

8. A windshield wiper system for an automatic vehicle as set forth in claim 1, wherein said time signal generator is an astable multivibrator for outputting a train of time signals with a constant period.

9. A windshield wiper system for moving a windshield wiper of an automotive vehicle, which comprises:
   (a) a distance signal generator for detecting a distance travelled by the vehicle and outputting a train of distance signals corresponding thereto;
   (b) a time signal generator for generating a train of reference time interval signals;
   (c) manual setting means for manually presetting a predetermined time interval value according to conditions of rainfall and outputting an intermittent time interval signal corresponding thereto;
   (d) a counter connected to said distance signal generator, said time signal generator and said manual setting means, for counting the number of distance signals output by said distance signal generator and the number of reference time interval signals output by said time signal generator, said counter including several flip-flop stages with output terminals, the respective output terminals of which are selectively switchable so as to be directly connected to the next stage in response to the intermittent time interval signal output by said manual setting means, said counter outputting a wiper driving signal when the current last flip-flop connected to the next stage by the intermittent time interval signal is set by the sum of the distance and time signals input thereto;
   (e) driving means connected to said counter for outputting a wiper motor driving signal in response to the wiper driving signal from said counter, said driving means resetting said counter whenever outputting the wiper motor driving signal; and
   (f) a wiper motor connected to said driving means for moving a windshield wiper in response to the wiper motor driving signal from said driving means, said wiper motor having a first commutator $C_1$ and a second commutator $C_2$.

10. A windshield wiper system for moving a windshield wiper of an automotive vehicle as set forth in claim 9, wherein said distance signal generator comprises:
    (a) a reed switch connected to be switched every time the vehicle travels a fixed distance; and
    (b) a monostable multivibrator connected to said reed switch for outputting a train of distance signals whenever triggered by a signal from said reed switch.

11. A windshield wiper system for moving a windshield wiper of an automotive vehicle as set forth in claim 9, wherein said time signal generator comprises an astable multivibrator for outputting a train of time interval signals having a constant period.

12. A windshield wiper system for moving a windshield wiper of an automotive vehicle as set forth in claim 9, wherein said driving means comprises:
(a) a monostable multivibrator for outputting a wiper motor driving signal in response to the wiper driving signal;
(b) a switching transistor connected to said monostable multivibrator to be turned on in response to an output signal from said monostable multivibrator; and
(c) a relay connected to a collector terminal of said switching transistor;
(d) a first switch $SW_1$ having:
 (1) a first fixed contact a;
 (2) a second fixed contact b connected to ground; and
 (3) a movable contact c connectable to the second commutator $C_2$ of said wiper motor,
(e) said relay arranged for connecting said movable contact c to said second fixed contact b in said first switch $SW_1$ in response to the wiper motor driving signal output by said monostable multivibrator, thereby to cause current to flow from $VB_2$, through $C_1$, $C_2$, c of $SW_1$, and b of $SW_1$, to ground, and to start rotation of said wiper motor;
(f) a second switch $SW_2$ having:
 (1) a first fixed contact a connected to a power supply $VB_2$ and to the first commutator $C_1$ of said wiper motor;
 (2) a second fixed contact b connected to ground; and
 (3) a movable contact c connected to said first fixed contact a of said first switch $SW_1$,
(g) said wiper motor arranged, upon rotation, for connecting said movable contact c to said second contact b in said second switch $SW_2$ thereby causing current to flow from $VB_2$, through $C_1$, $C_2$, c of $SW_1$, a of $SW_1$, c of $SW_2$, b of $SW_2$, to ground, to maintain rotation of said wiper motor after said relay has been deenergized to connect said movable contact c to said first contact a in said first switch $SW_1$, and until said wiper motor is automatically switched for again connecting said movable contact c to said first contact a in said second switch $SW_2$, and for shorting said two commutators $C_1$ and $C_2$ in a circuit comprising $C_1$, a of $SW_2$, c of $SW_2$, a of $SW_1$, c of $SW_1$ and $C_2$.

13. A windshield wiper system for moving a windshield wiper of an automotive vehicle, which comprises:

(a) a distance signal generator for detecting a distance travelled by the vehicle and outputting a train of distance signals corresponding thereto;
(b) a time signal generator for generating a train of reference time interval signals;
(c) manual setting means for manually presetting a predetermined time interval value according to conditions of rainfall and outputting an intermittent time interval signal corresponding thereto;
(d) a counter connected to said distance signal generator, said time signal generator and said manual setting means, for counting the number of distance signals output by said distance signal generator and the number of reference time interval signals output by said time signal generator, said counter including several flip-flop stages with output terminals, the respective output terminals of which are selectively switchable so as to be directly connected to the next stage in response to the intermittent time interval signal output by said manual setting means, said counter outputting a wiper driving signal when the current last flip-flop connected to the next stage by the intermittent time interval signal is set by the sum of the distance and time signals input thereto;
(e) driving means connected to said counter for outputting a wiper motor driving signal in response to the wiper driving signal from said counter, said driving means resetting said counter when outputting the wiper motor driving signal;
(f) a wiper motor for moving a windshield wiper;
(g) first switching means responsive to said wiper motor driving signal for temporarily providing current to said wiper motor, thereby causing said wiper motor to begin rotation; and
(h) second switching means responsive to rotation of said wiper motor for providing current thereto to maintain such rotation after said first switching means ceases to provide such current;
(i) whereby said wiper motor intermittently moves said windshield wiper at intermittent time intervals determined by the elapsed time and distance travelled by said vehicle.

14. A windshield wiper system as in claim 13 further comprising third switching means operable for establishing desired interconnections among said wiper and said first and second switching means to enable said wiper motor to be activated in a particular mode of operation.

* * * * *